(12) United States Patent
Chen (10) Patent No.: US 12,422,930 B2
(45) Date of Patent: Sep. 23, 2025

(54) DISPLAY DEVICE (71) Applicants: Beijing BOE Technology Development Co., Ltd., Beijing (CN); BOE Technology Group Co., Ltd., Beijing (CN)

(72) Inventor: Yuju Chen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 6 days.

(21) Appl. No.: 18/562,843

(22) PCT Filed: May 31, 2021

(86) PCT No.: PCT/CN2021/097425
§ 371 (c)(1),
(2) Date: Nov. 21, 2023

(87) PCT Pub. No.: WO2022/252058
PCT Pub. Date: Dec. 8, 2022

(65) Prior Publication Data
US 2024/0272718 A1    Aug. 15, 2024

(51) Int. Cl.
*G06F 3/01* (2006.01)
*G06F 3/041* (2006.01)
*G06F 3/044* (2006.01)

(52) U.S. Cl.
CPC ............ *G06F 3/016* (2013.01); *G06F 3/0412* (2013.01); *G06F 3/0446* (2019.05); *G06F 2203/04107* (2013.01)

(58) Field of Classification Search
CPC ...... G06F 3/016; G06F 3/0412; G06F 3/0446; G06F 2203/04107; G06F 2203/04105; G06F 3/041
See application file for complete search history.

(56) References Cited

U.S. PATENT DOCUMENTS 9,448,713 B2    9/2016    Cruz-Hernandez et al.
9,785,239 B2    10/2017   Haga et al.
(Continued)

FOREIGN PATENT DOCUMENTS

CN    101008726 A    8/2007
CN    102478984 A    5/2012
(Continued)

OTHER PUBLICATIONS

International Search Report for PCT/CN2021/097425 Mailed Feb. 16, 2022.

*Primary Examiner* — Ibrahim A Khan
(74) *Attorney, Agent, or Firm* — Ling Wu; Stephen Yang; Ling and Yang Intellectual Property (57) ABSTRACT

The present disclosure provides a display device. In order to avoid high-frequency noise in a display screen that is caused by friction when a display screen vibrates, a touch screen is not directly attached to the display screen, the display screen and the touch screen instead being fixed together by means of a fixing structure such that a certain gap remains between the display screen and the touch screen, wherein air or another flowing liquid which does not affect display can be filled in the gap. Moreover, the Young's modulus of the fixing structure is less than 0.1 MPa, so as to ensure that the fixing structure does not substantially inhibit the vibration of the touch screen during operation of a touch sensor.

19 Claims, 6 Drawing Sheets

(56) References Cited

U.S. PATENT DOCUMENTS

| | | | |
|---|---|---|---|
| 9,904,366 | B2 | 2/2018 | Van Der Avoort et al. |
| 10,452,185 | B2 | 10/2019 | Kim et al. |
| 10,656,714 | B2 | 5/2020 | Ligtenberg et al. |
| 2007/0171326 | A1 | 7/2007 | Taguchi et al. |
| 2013/0328820 | A1* | 12/2013 | Kondoh ................ G06F 1/1643 345/173 |
| 2016/0132117 | A1* | 5/2016 | Adachi .................. G06F 3/041 345/173 |
| 2016/0154462 | A1* | 6/2016 | Haga ...................... G06F 3/016 345/174 |
| 2016/0202837 | A1 | 7/2016 | Miyamoto et al. |
| 2016/0262273 | A1* | 9/2016 | Fujita .................... G02F 1/1341 |
| 2017/0060244 | A1* | 3/2017 | Khoshkava ............. G06F 3/016 |
| 2018/0074694 | A1* | 3/2018 | Lehmann ................ G06F 3/016 |
| 2019/0377414 | A1* | 12/2019 | Takeda .................. G06F 3/0414 |
| 2020/0081543 | A1 | 3/2020 | Vezzoli et al. |
| 2022/0404911 | A1* | 12/2022 | Chu ....................... G06F 3/016 |

FOREIGN PATENT DOCUMENTS

| | | |
|---|---|---|
| CN | 203706170 U | 7/2014 |
| CN | 104407707 A | 3/2015 |
| CN | 105373277 A | 3/2016 |
| CN | 105580021 A | 5/2016 |
| CN | 105654851 A | 6/2016 |
| CN | 105718114 A | 6/2016 |
| CN | 105938267 A | 9/2016 |
| CN | 206209657 U | 5/2017 |
| CN | 106940622 A | 7/2017 |
| CN | 109240485 A | 1/2019 |
| CN | 111033443 A | 4/2020 |
| CN | 111263924 A | 6/2020 |
| JP | 2002259052 A | 9/2002 |

* cited by examiner

DISPLAY DEVICE

CROSS-REFERENCE TO RELATED APPLICATION

The present application is a U.S. National Phase Entry of International Application No. PCT/CN2021/097425 having an international filing date of May 31, 2021. The entire contents of the above-identified application are hereby incorporated by reference.

TECHNICAL FIELD

The present disclosure relates to the field of display technologies, and more particularly, to a display apparatus.

BACKGROUND

Haptics is a focus of modern technology development. Specifically, haptics enables a terminal to interact with a human body through tactile sensation. Haptics may be divided into two categories, one is vibration feedback and the other is a tactile reproduction technology.

In a surface tactile reproduction technology, characteristics of objects may be perceived through a bare finger on a touch screen, and efficient and natural interaction may be achieved in multimedia terminals, which has great research value, and has been widely concerned by domestic and foreign researchers. Surface tactile sensation, in physical sense, means that surface roughness of an object acts on a surface of a skin (fingertip), and different friction forces are formed due to different surface structures. Therefore, by controlling surface friction forces, simulation of different tactile sensations/sense of touch may be achieved.

SUMMARY

An embodiment of the present disclosure provides a display apparatus, including: a display screen; a touch screen located at a light-emitting side of the display screen, wherein the touch screen includes a tactile sensor configured to generate a standing wave on a surface of the touch screen when working; and a fixing structure located between the display screen and the touch screen, wherein a Young's modulus of the fixing structure is less than 0.1 MPa, and the fixing structure is configured to maintain a gap between the touch screen and the display screen that is not less than an amplitude of the standing wave when the tactile sensor is turned off.

In one possible implementation mode, in the display apparatus according to the embodiment of the present disclosure, the fixing structure is located at positions of two opposite side frames of the touch screen, and extension directions of the two side frames are perpendicular to a vibration propagation direction of the standing wave.

In one possible implementation mode, in the display apparatus according to the embodiment of the present disclosure, the fixing structure is located only at a position of a side frame of a surface, on a side facing the display screen, of the touch screen.

In one possible implementation mode, in the display apparatus according to the embodiment of the present disclosure, the fixing structure is a clamping structure covering the side frames of the touch screen.

In one possible implementation mode, in the display apparatus according to the embodiment of the present disclosure, the display screen includes a display panel and a bracket disposed around a frame of the display panel; and the fixing structure is fixed with the bracket, and/or the fixing structure is fixed with the frame of the display panel.

In one possible implementation mode, the display apparatus according to the embodiment of the present disclosure further includes a sound absorbing sponge located between the fixing structure and the display screen.

In one possible implementation mode, in the display apparatus according to the embodiment of the present disclosure, the sound absorbing sponge has a thickness of less than 2 mm and a density greater than 0.01 g/cm$^3$.

In one possible implementation mode, in the display apparatus according to the embodiment of the present disclosure, the gap between the touch screen and the display screen is greater than 2 um.

In one possible implementation mode, in the display apparatus according to the embodiment of the present disclosure, a material of the fixing structure is a colloid having a thickness greater than 10 um.

In one possible implementation mode, the display apparatus according to the embodiment of the present disclosure further includes a liquid optical clear adhesive filled at the gap between the touch screen and the display screen, the liquid optical clear adhesive has a viscosity less than 400 Cps.

In one possible implementation mode, in the display apparatus according to the embodiment of the present disclosure, the touch screen includes a substrate, and a touch structure, a first insulation layer, the tactile sensor, and a planarization layer that are stacked in sequence on a side of the substrate facing the display screen.

In one possible implementation mode, in the display apparatus according to the embodiment of the present disclosure, a surface of the planarization layer on a side facing the display screen is a roughened surface with a roughness greater than 200 nm.

In one possible implementation mode, in the display apparatus according to the embodiment of the present disclosure, the touch screen further includes: a shield conductive layer located between the first insulation layer and the tactile sensor, and a second insulation layer located between the shield conductive layer and the tactile sensor.

In one possible implementation mode, in the display apparatus according to the embodiment of the present disclosure, the touch screen further includes: multiple posts located on a side of the planarization layer facing the display screen, and a height of a post is 70%-90% of the gap between the touch screen and the display screen.

In one possible implementation mode, in the display apparatus according to the embodiment of the present disclosure, the tactile sensor has a grid-like pattern, grids of the grid-like pattern are disposed corresponding to display pixels in the display screen; and an orthographic projection of the post on the substrate is located at a dot position of the grid-like pattern.

In one possible implementation mode, in the display apparatus according to the embodiment of the present disclosure, the tactile sensor includes a first electrode, a piezoelectric material layer, and a second electrode that are stacked; and the first electrode, the piezoelectric material layer, and the second electrode all have a grid-like pattern.

DETAILED DESCRIPTION

An ultrasonic tactile reproduction device uses a piezoelectric element to resonate to form a standing wave and form a film pressing effect. This structure only needs a planar body (such as glass or metal plate), on which a corresponding piezoelectric ceramic body or ceramic membrane is designed, so that a tactile reproduction effect may be achieved on this plane.

Figure 1A:
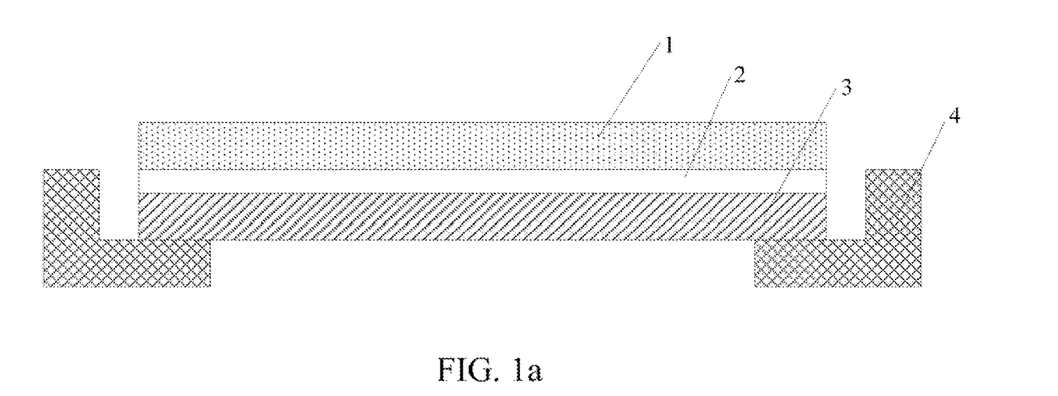
FIG. 1a is a schematic diagram of a structure of a display apparatus according to the related art.
Figure 1B:
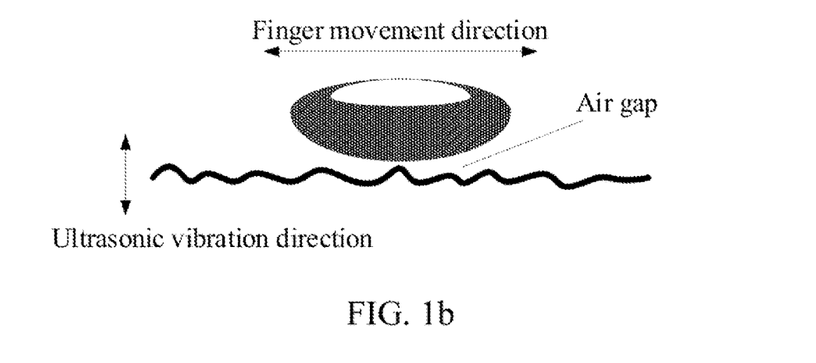
FIG. 1b is a schematic diagram of a principle of achieving tactile reproduction.

A structure of combination of a traditional touch screen and a display product is shown in FIG. 1a, and is mainly formed by manufacturing a capacitive touch screen device on a Cover Glass (CG) 1, and attaching the CG and a display screen 2 through an Optical Clear Adhesive (OCA). Tactile reproduction also uses piezoelectric vibration to generate a standing wave structure on a CG surface, and a friction force between fingers and glass surface is changed through a film pressing effect, thus achieving regulation of the friction force, as shown in FIG. 1b. Since a glass surface must generate structural vibration, if a traditional OCA is used for attaching, the vibration will be greatly suppressed, and axial (x-axis or y-axis) fluctuation (or vibration) will be generated when the structure vibrates. If traditional plastic or metal is used for manufacturing a frame bracket 4, heat energy will be generated due to friction, and a high-frequency noise will be generated due to friction, which will affect user experience.

In order to make objectives, technical solutions, and advantages of the embodiments of the present disclosure more clear, the technical solutions of the embodiments of the present disclosure will be clearly and completely described below with reference to the drawings of the embodiments of the present disclosure. Apparently, the described embodiments are a part of the embodiments of the present disclosure, but not all of the embodiments. Furthermore, without a conflict, the embodiments in the present disclosure and features in the embodiments may be combined with each other. Based on the described embodiments of the present disclosure, all other embodiments obtained by those of ordinary skill in the art without creative labor belong to the protection scope of the present disclosure.

Unless otherwise defined, technical terms or scientific terms used in the present disclosure should have meanings as commonly understood by those of ordinary skill in the field to which the present disclosure belongs to. "Include", "contain", or similar words in the present disclosure mean that elements or objects appearing before the words cover elements or objects listed after the words and their equivalents, but do not exclude other elements or objects.

It should be noted that sizes and shapes of various figures in the drawings do not reflect real proportions, and are only for a purpose of schematically illustrating contents of the present disclosure. Moreover, same or similar reference numerals indicate same or similar elements or elements having same or similar functions throughout.

Figure 2:
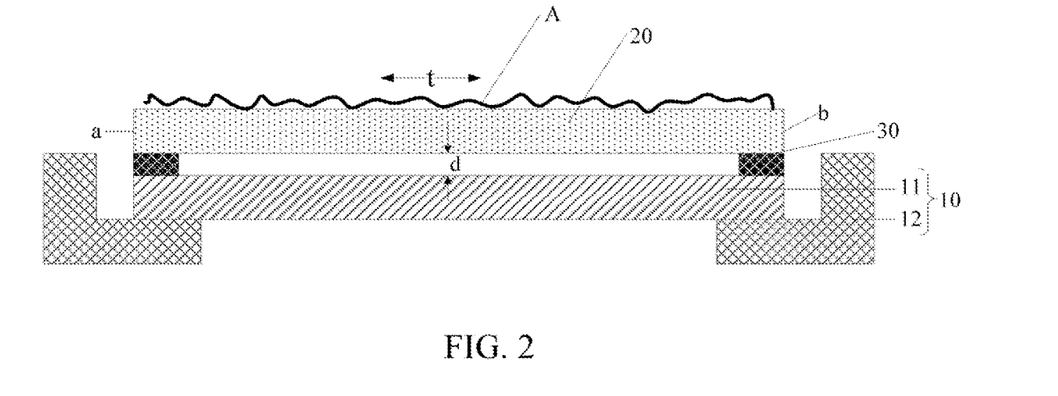
FIG. 2 is a schematic diagram of a structure of a display apparatus according to an embodiment of the present disclosure.
Figure 3:
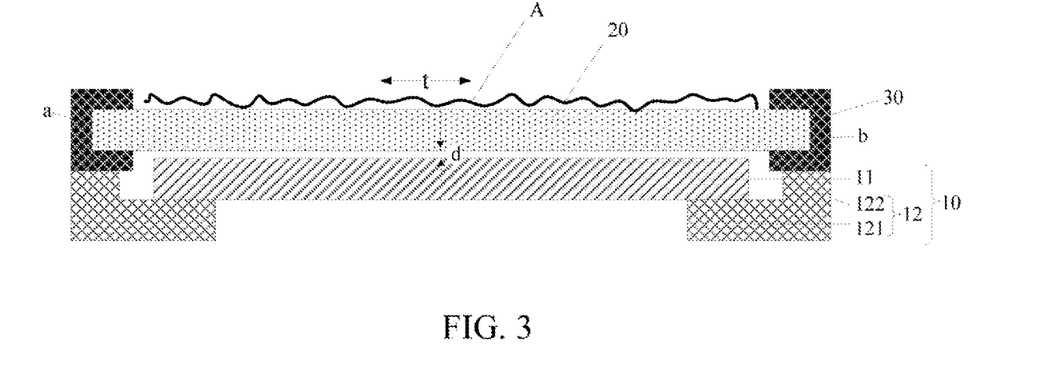
FIG. 3 is a schematic diagram of another structure of a display apparatus according to an embodiment of the present disclosure.

An embodiment of the present disclosure provides a display apparatus, as shown in FIGS. 2 and 3, including: a display screen 10; a touch screen 20 located on a light-emitting side of the display screen 10, wherein the touch screen 20 includes a tactile sensor 21 (see FIG. 8 for details) configured to generate a standing wave A on a surface of the touch screen 20 when working; and a fixing structure 30 located between the display screen 10 and the touch screen 20, wherein a Young's modulus of the fixing structure 30 is less than 0.1 MPa, and the fixing structure 30 is configured to maintain a gap d between the touch screen 20 and the display screen 10 that is not less than an amplitude of the standing wave when the tactile sensor 21 is turned off.

In the display apparatus according to the embodiment of the present disclosure, in order to avoid a high-frequency noise generated by the display screen 10 caused by friction when the touch screen 20 vibrates, the touch screen 20 is not directly attached to the display screen 10, but the fixing structure 30 is adopted to fix the display screen 10 and the touch screen 20, so that a certain gap d is maintained between the display screen 10 and the touch screen 20, and air or other flowing liquid that does not affect display may be filled in the gap. Furthermore, the Young's modulus of the fixing structure 30 is less than 0.1 MPa to ensure that the fixing structure 30 does not greatly suppress vibration of the touch screen 20 when the tactile sensor 21 is operated. Existence of the gap d between the display screen 10 and the touch screen 20 prevents high-frequency noise and heat energy generated by friction between the display screen 10 and the touch screen 20, which will affect user experience.

Optionally, in the embodiment of the present disclosure, when the tactile sensor 21 is working, a standing wave is generated on a surface of the touch screen 20 on a side facing away from the display screen 10. The standing wave vibrates along an x-axis or a y-axis parallel to the surface of the touch screen 20 and has a certain amplitude in a direction perpendicular to the surface of the touch screen 20. In order to ensure that two surfaces of the touch screen 20 opposite to the display screen 10 contact due to vibration and produce collision sound when the tactile sensor 21 is working, the gap d between the touch screen 20 and the display screen 10 should be larger than the amplitude of the standing wave. Generally, the maximum amplitude generated by the standing wave is within 2 um, so the gap d between the touch screen 20 and the display screen 10 generally needs to be larger than 2 um.

Optionally, in the embodiment of the present disclosure, in order to ensure that the fixing structure 30 has a relatively small Young's modulus, a material of the fixing structure 30 may be colloid, such as silica gel, and a thickness of the colloid is generally greater than 10 um in order to ensure that the display screen 10 and the touch screen 20 can be firmly fixed.

Optionally, in the embodiment of the present disclosure, in order to reduce an influence of the fixing structure 30 on a display effect of the display apparatus, the fixing structure 30 is generally disposed at a frame of the touch screen 20. Furthermore, in order to reduce the fixing structure 30 suppressing vibration generated when the tactile sensor 21 is working, as shown in FIGS. 2 and 3, the fixing structure 30 may be located at positions of two opposite side frames a and b of the touch screen 20, and extension directions of the two side frames a and b (perpendicular to a paper surface) are perpendicular to a vibration propagation direction t of the standing wave A. For example, if a propagation direction of the standing wave generated by the tactile sensor 21 is a direction along a long side of the display apparatus, the fixing structure 30 is disposed at a position of a short side of the display apparatus. Of course, it is also within the protection scope of the present disclosure to provide a surrounding fixing structure 30 at frames around the touch screen 20.

Optionally, in the embodiment of the present disclosure, as shown in FIG. 2, the fixing structure 30 may be located only at positions of side frames a and b of a surface of touch screen 10 on a side facing the display screen 20. That is, the fixing structure 30 may be disposed on the surface of the touch screen 20 on the side facing the display screen 10. In order not to affect display adversely, specifically, the fixing structure 30 may be disposed by using a non-display region, i.e. a frame position, in the display screen 10.

Optionally, in the embodiment of the present disclosure, as shown in FIG. 3, the fixing structure 30 may also be a clamping structure covering a side frame of the touch screen 20, that is, the fixing structure 30 surrounds the side frame from one side surface of the frame to the other side surface, and a cross-sectional shape of the fixing structure 30 along a surface perpendicular to the touch screen 20 is similar to a U-shape. The clamping structure has a relatively large contact area with the touch screen 20, and a fixing effect is relatively good, but a surface of the touch screen 20 on a side facing away from the display screen 10 protrudes from a surface of the touch screen 20 on a side away from the display screen 10.

Optionally, in the embodiment of the present disclosure, as shown in FIGS. 2 and 3, the display screen 10 specifically includes a display panel 11 and a bracket 12 disposed around a frame of the display panel 11. The display panel 11 may be a liquid crystal display panel, an OLED display panel, or a display panel that emits light according to other principles, which is not limited herein. The bracket 12 has a base 121 supporting a bottom of the display panel 11, and a support portion 122 surrounding a side of the display panel. As shown in FIG. 2, a height of the support portion 122 may be greater than a thickness of the display panel 11, and as shown in FIG. 3, the height of the support portion 122 may also be smaller than the thickness of the display panel 11. Specifically, as shown in FIG. 3, the fixing structure 30 may be directly fixed with the bracket 12, that is, fixedly connected with the support portion 122 of the bracket 12. Optionally, as shown in FIG. 2, the fixing structure 30 may be fixed with the frame of the display panel 11. Or, the fixing structure 30 may be fixed with the bracket 12 and the frame of the display panel 11 at the same time, which is not limited herein.

Figure 4:
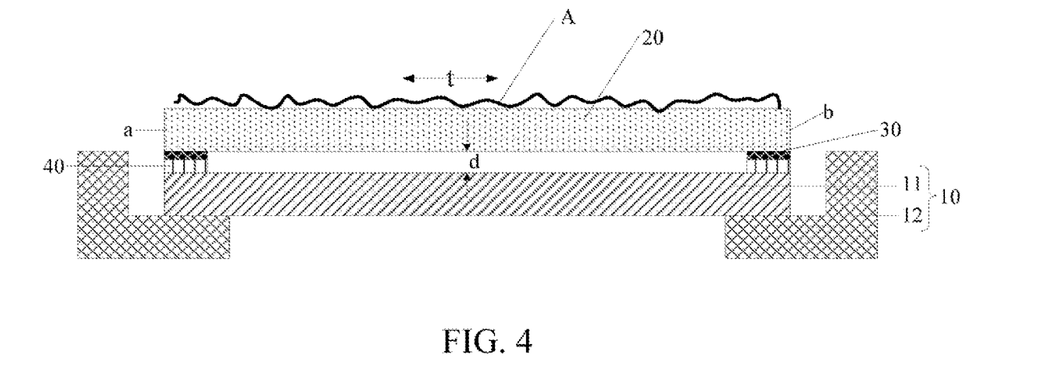
FIG. 4 is a schematic diagram of another structure of a display apparatus according to an embodiment of the present disclosure.
Figure 5:
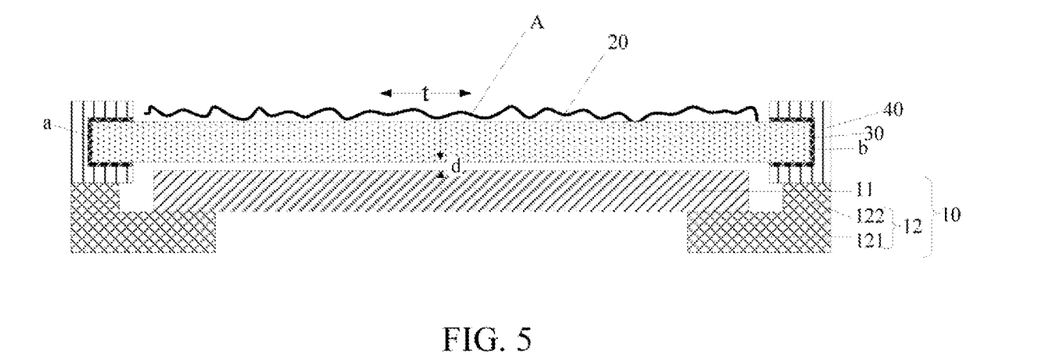
FIG. 5 is a schematic diagram of another structure of a display apparatus according to an embodiment of the present disclosure.

Optionally, in the embodiment of the present disclosure, as shown in FIGS. 4 and 5, the display apparatus may further include a sound absorbing sponge 40 located between the fixing structure 30 and the display screen 10, and the sound absorbing sponge 40 may absorb vibration sound when the tactile sensor 21 is working. Morphology of the sound absorbing sponge 40 may be consistent with the fixing structure 30. For example, as shown in FIG. 4, when the fixing structure 30 is located only on a surface of the touch screen 20 on a side facing the display screen 10, the sound absorbing sponge 40 is located between the fixing structure 30 and the display screen 10. For another example, as shown in FIG. 5, when the fixing structure 30 is a clamping structure, the sound absorbing sponge 40 may also be of a clamping structure, that is, the sound absorbing sponge 40 is wrapped on an outer side of the clamping structure of the fixing structure 30, and a cross-sectional shape of the sound absorbing sponge 40 along a surface perpendicular to the touch screen 20 is similar to a U-shape, so that the sound absorbing sponge 40 has a relatively large area, and its sound absorbing effect will be relatively good.

Optionally, in the embodiment of the present disclosure, a thickness of the sound absorbing sponge 40 is generally less than 2 mm to ensure that the display apparatus may maintain a relatively thin thickness after addition of the sound absorbing sponge 40. In order to ensure that the sound absorbing sponge 40 has a relatively good sound absorbing effect, according to test results of different densities of actual sound absorbing sponges, it may be seen that a noise of greater than 40 db may be measured when a density is less than 0.01 g/cm$^3$. Therefore, a high-density sound absorbing sponge with a density greater than 0.01 g/cm$^3$ needs to be adopted for the sound absorbing sponge 40 of the embodiment of the present disclosure, so that in this way vibration and noise may be effectively suppressed and absorbed.

Figure 6:
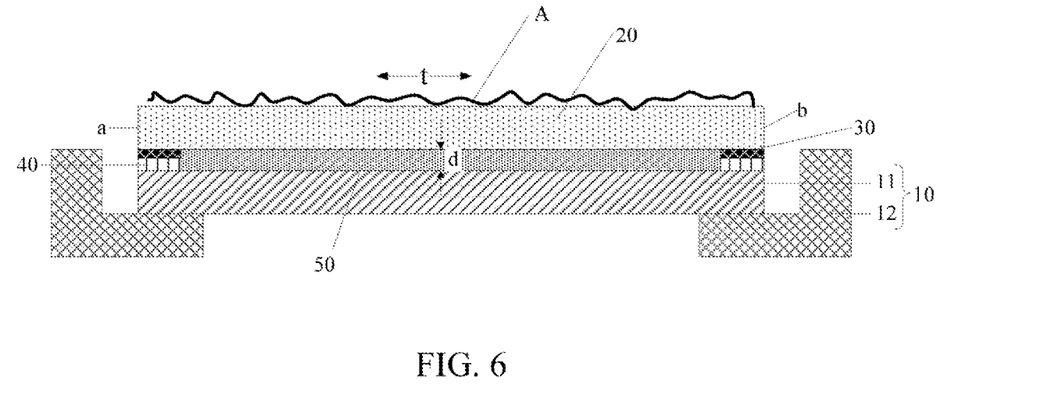
FIG. 6 is a schematic diagram of another structure of a display apparatus according to an embodiment of the present disclosure.
Figure 7:
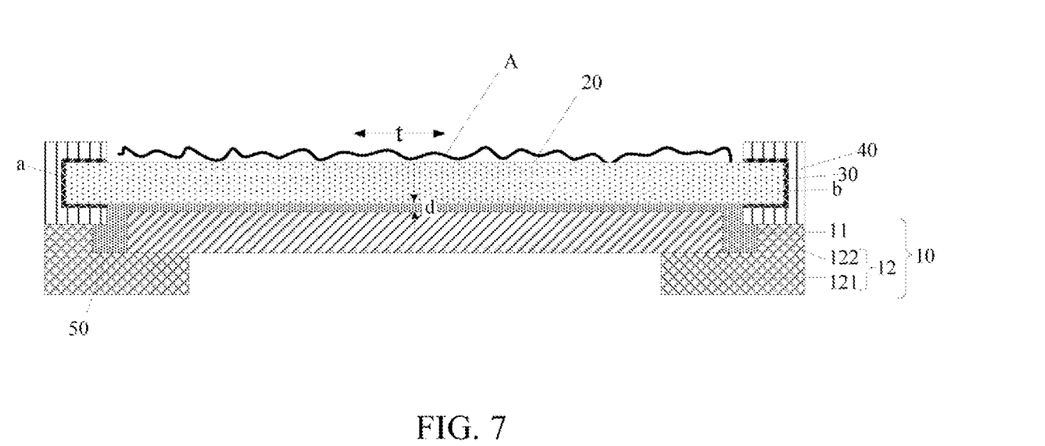
FIG. 7 is a schematic diagram of another structure of a display apparatus according to an embodiment of the present disclosure.

Optionally, in the embodiment of the present disclosure, as shown in FIGS. 6 and 7, the display apparatus may further include a Liquid Optical Clear Adhesive 50 (LOCA) filled at a gap between the touch screen 20 and the display screen 10, and a viscosity of the liquid optical clear adhesive 50 is less than 400 Cps.

Specifically, when air is filled in the gap between the touch screen 20 and the display screen 10, since a refractive index of the air is smaller than that of the display screen 10, a problem of light extraction may occur at an interface between the touch screen 20 and the display screen 10. However, when an air gap is filled with the liquid optical clear adhesive 50, a refractive index of the liquid optical clear adhesive 50 is close to that of the display screen 10, so the problem of light extraction may be reduced. Moreover, the liquid optical clear adhesive 50 is different from a conventional cured optical clear adhesive, and its viscosity needs to be less than 400 Cps, that is, the liquid optical clear adhesive 50 cannot form a solid or viscoelastic body, but must exist in a form of liquid, and existence of the liquid optical clear adhesive 50 may play a role in damping vibration of the liquid.

Figure 8:
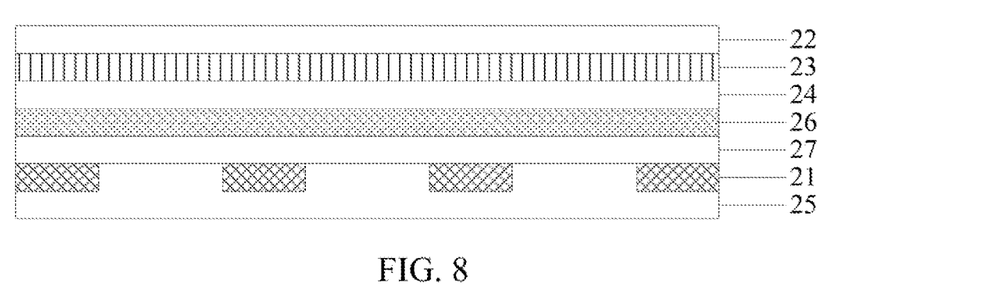
FIG. 8 is a schematic diagram of a structure of a touch screen in a display apparatus according to an embodiment of the present disclosure.

Optionally, in the embodiment of the present disclosure, as shown in FIG. 8, the touch screen 20 may specifically include a substrate 22, a touch structure 23, a first insulation layer 24, a tactile sensor 21, and a planarization layer 25 that are sequentially stacked on a side of the substrate 22 facing the display screen 10.

Specifically, a single-layer or multi-layer structure may be adopted for the touch structure 23, a capacitive touch structure may be adopted for the touch structure specifically, and is composed of patterned Indium Tin Oxide (ITO) or nano-metal traces, and specific composition of the touch structure is not limited herein. The first insulation layer 24 plays a role in protecting the touch structure 23, and may be formed of an inorganic materials such as SiNx or $SiO_2$, or may be formed of an organic material such as Polyimide (PI). Optionally, in the embodiment of the present disclosure, as shown in FIG. 8, the touch screen 20 may further include a shield conductive layer 26 located between the first insulation layer 24 and the tactile sensor 21, and a second insulation layer 27 located between the shield conductive layer 26 and the tactile sensor 21. The shield conductive layer 26 may be an ITO covering layer disposed on a whole surface. The shield conductive layer 26 is used for isolating a piezoelectric vibration signal from a touch screen signal to avoid crosstalk. The shield conductive layer 26 is generally connected with a system Ground (GND) signal. The second insulation layer 27 plays a role in protecting the shield conductive layer 26, and may be formed of an inorganic material such as SiNx or $SiO_2$, or may be formed of an organic material such as PI.

Optionally, in the embodiment of the present disclosure, SiNx, photoresist, Polymethyl Methacrylate (PMMA), or PI are used for performing leveling and passivation on a surface of the tactile sensor 21 to form a planarization layer 25. Furthermore, a surface of the planarization layer 25 may be subjected to a plasma roughening treatment so that a surface of the planarization layer 25 on a side facing the display screen 10 is a roughened surface with a roughness greater than 200 nm, so as to reduce a problem of light extraction at an interface between the two due to a face that a refractive index of an air gap d is smaller than that of the display screen 10.

Figure 9:
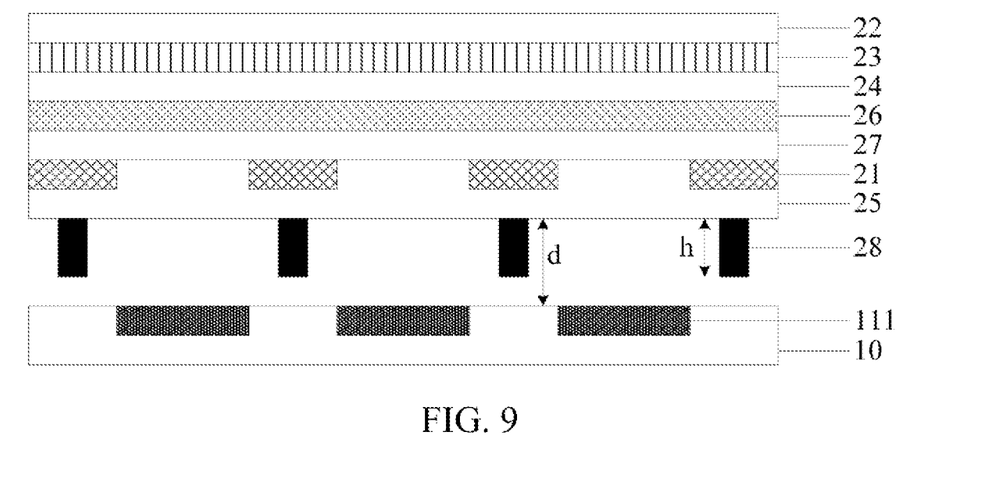
FIG. 9 is a schematic diagram of another structure of a display apparatus according to an embodiment of the present disclosure.

Optionally, in the embodiment of the present disclosure, as shown in FIG. 9, the touch screen 20 may further include multiple posts 28 located on a side of the planarization layer 25 facing the display screen 10, a height h of a post 28 is 70%-90% of the gap d between the touch screen 20 and the display screen 10. Specifically, a post 28 may be made of a post spacer material on a surface of the planarization layer 25, and the height of the post 28 is smaller than the gap d between the touch screen 20 and the display screen 10, that is, the post 28 will not contact the display screen 10 when the tactile sensor 21 is not working. The post 28 is used for maintaining the gap d between the touch screen 20 and the display screen 10 to avoid sound generated by contact between the touch screen 20 and the display screen 10 during vibration.

Figure 10:
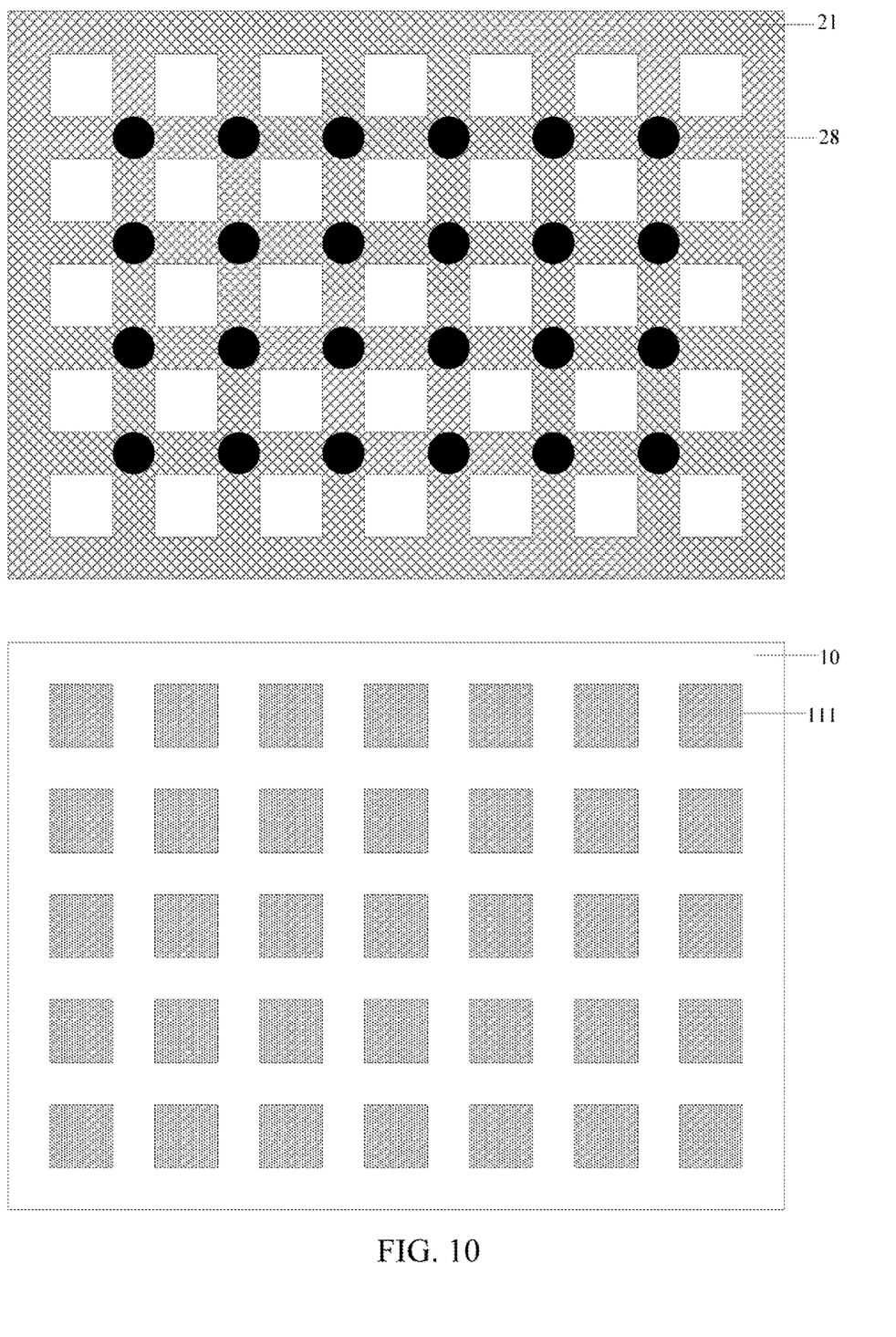
FIG. 10 is a schematic diagram of another structure of a display apparatus according to an embodiment of the present disclosure.

Optionally, in the embodiment of the present disclosure, as shown in FIG. 10, the tactile sensor 21 has a grid-like pattern, and a grid of the grid-like pattern (i.e., an opening, at which there is generally no pattern of the tactile sensor 21) is disposed corresponding to a display pixel 111 in the display screen 10. Specifically, one grid may correspond to one display pixel 111 as shown in FIG. 10, or one grid may correspond to multiple display pixels 111. In order not to affect normal display adversely, an orthographic projection of the post 28 on the substrate 22 is located at a dot position of the grid-like pattern, i.e., the orthographic projection of the post 28 in the display screen 10 is not overlapped with a display pixel 111.

Figure 11:
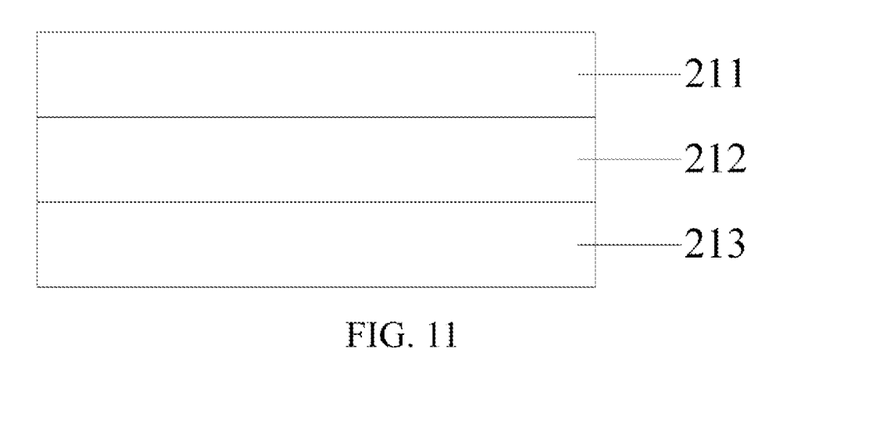
FIG. 11 is a schematic diagram of a structure of a tactile sensor in a display apparatus according to an embodiment of the present disclosure.

Optionally, in the embodiment of the present disclosure, as shown in FIG. 11, the tactile sensor 21 may specifically include a first electrode 211, a piezoelectric material layer 212, and a second electrode 213 that are stacked; the first electrode 211, the piezoelectric material layer 212, and the second electrode 213 may all have a grid-like pattern, i.e., there is no pattern at a position corresponding to a display pixel 111, so that a transmittance of display may be improved. The first electrode 211 and the second electrode 213 may be made of a material such as ITO, Al, Ti, and Mo, and have a thickness of 100 nm to 300 nm. The piezoelectric material layer 212 may specifically be made of a piezoelectric ceramic material.

According to the display apparatus according to the embodiment of the present disclosure, in order to avoid the high-frequency noise generated by the display screen caused by friction when the touch screen vibrates, a mode that the touch screen is not directly attached to the display screen is used, the fixing structure is adopted for fixing the display screen and the touch screen, so that a certain gap is kept between the display screen and the touch screen, and air or other flowing liquid which does not affect display adversely may be filled in the gap. Moreover, the Young's modulus of the fixing structure should be less than 0.1 MPa, so as to ensure that the fixing structure will not greatly suppress vibration of the touch screen when the tactile sensor is working. Existence of the gap between the display screen and the touch screen prevents friction between the two from generating a high-frequency noise and heat energy, which will affect user experience.

Apparently, those skilled in the art may make various modifications and variations to the present disclosure without departing from the spirit and scope of the present disclosure. Thus, if these modifications and variations to the present disclosure fall within the scope of the claims of the present disclosure and their equivalent techniques, the present disclosure is intended to include these modifications and variations.

The invention claimed is:

1. A display apparatus, comprising:
 a display screen;
 a touch screen located at a light-emitting side of the display screen, wherein the touch screen comprises a tactile sensor configured to generate a standing wave on a surface of the touch screen when working; and
 a fixing structure located between the display screen and the touch screen, wherein a Young's modulus of the fixing structure is less than 0.1 MPa, and the fixing structure is configured to maintain a gap between the touch screen and the display screen that is not less than an amplitude of the standing wave when the tactile sensor is turned off,
 wherein the touch screen comprises a substrate, and a touch structure, a first insulation layer, the tactile sensor, and a planarization layer that are stacked in sequence on a side of the substrate facing the display screen.

2. The display apparatus according to claim 1, wherein the fixing structure is located at positions of two opposite side frames of the touch screen, and extension directions of the two side frames are perpendicular to a vibration propagation direction of the standing wave.

3. The display apparatus according to claim 2, wherein the fixing structure is located only at a position of a side frame of a surface, on a side facing the display screen, of the touch screen.

4. The display apparatus according to claim 2, wherein the fixing structure is a clamping structure covering the side frames of the touch screen.

5. The display apparatus according to claim 2, wherein the display screen comprises a display panel and a bracket disposed around a frame of the display panel; and the fixing structure is fixed with the bracket, and/or the fixing structure is fixed with the frame of the display panel.

6. The display apparatus according to claim 2, further comprising a sound absorbing sponge located between the fixing structure and the display screen.

7. The display apparatus according to claim 2, wherein the gap between the touch screen and the display screen is greater than 2 um.

8. The display apparatus according to claim 2, wherein a material of the fixing structure is a colloid having a thickness greater than 10 um.

9. The display apparatus according to claim 1, wherein the display screen comprises a display panel and a bracket disposed around a frame of the display panel; and the fixing structure is fixed with the bracket, and/or the fixing structure is fixed with the frame of the display panel.

10. The display apparatus according to claim 1, further comprising a sound absorbing sponge located between the fixing structure and the display screen.

11. The display apparatus according to claim 10, wherein the sound absorbing sponge has a thickness of less than 2 mm and a density greater than 0.01 g/cm$^3$.

12. The display apparatus according to claim 1, wherein the gap between the touch screen and the display screen is greater than 2 um.

13. The display apparatus according to claim 1, wherein a material of the fixing structure is a colloid having a thickness greater than 10 um.

14. The display apparatus according to claim 1, further comprising a liquid optical clear adhesive filled at the gap between the touch screen and the display screen, the liquid optical clear adhesive has a viscosity less than 400 Cps.

15. The display apparatus according to claim 1, wherein a surface of the planarization layer on a side facing the display screen is a roughened surface with a roughness greater than 200 nm.

16. The display apparatus according to claim 1, wherein the touch screen further comprises: a shield conductive layer located between the first insulation layer and the tactile sensor, and a second insulation layer located between the shield conductive layer and the tactile sensor.

17. The display apparatus according to claim 1, wherein the touch screen further comprises: a plurality of posts located on a side of the planarization layer facing the display screen, and a height of a post is 70%-90% of the gap between the touch screen and the display screen.

18. The display apparatus according to claim 17, wherein the tactile sensor has a grid-like pattern, grids of the grid-like pattern are disposed corresponding to display pixels in the display screen; and an orthographic projection of the post on the substrate is located at a dot position of the grid-like pattern.

19. The display apparatus according to claim 18, wherein the tactile sensor comprises a first electrode, a piezoelectric material layer, and a second electrode that are stacked; and the first electrode, the piezoelectric material layer, and the second electrode all have a grid-like pattern.

\* \* \* \* \*